US009328395B2

(12) United States Patent
Martinis et al.

(10) Patent No.: US 9,328,395 B2
(45) Date of Patent: May 3, 2016

(54) METHOD AND APPARATUS FOR PRODUCING DIRECT REDUCED IRON UTILIZING A SOURCE OF REDUCING GAS COMPRISING HYDROGEN AND CARBON MONOXIDE

(75) Inventors: Alessandro Martinis, Zugliano-Pozzuolo del Friuli (IT); Michele Condosta, Vigodarzere (IT); Eugenio Zendejas Martínez, Nuevo Leon (MX); Pablo Enrique Duarte Escareño, Nuevo Leon (MX)

(73) Assignees: DANIELI & C. OFFICINE MECCANICHE SPA, Buttrio (IT); HYL TECHNOLOGIES S.A. DE C.V., San Nicolas de los Garza (MX)

( * ) Notice: Subject to any disclaimer, the term of this patent is extended or adjusted under 35 U.S.C. 154(b) by 515 days.

(21) Appl. No.: 13/824,648

(22) PCT Filed: Sep. 28, 2011

(86) PCT No.: PCT/IB2011/002264
§ 371 (c)(1),
(2), (4) Date: Aug. 7, 2013

(87) PCT Pub. No.: WO2012/042352
PCT Pub. Date: Apr. 5, 2012

(65) Prior Publication Data
US 2013/0305883 A1    Nov. 21, 2013

(30) Foreign Application Priority Data
Sep. 29, 2010    (IT) .............................. UD2010A0177

(51) Int. Cl.
*C21B 13/02*    (2006.01)
*C21B 13/00*    (2006.01)
(Continued)

(52) U.S. Cl.
CPC ........ *C21B 13/0073* (2013.01); *B01D 53/1475* (2013.01); *B01D 53/75* (2013.01);
(Continued)

(58) Field of Classification Search
CPC   C21B 13/02; C21B 13/0073; C21B 2100/02; C21B 2100/04; C21B 2100/06; B01D 53/1475; B01D 53/75
See application file for complete search history.

(56) References Cited

U.S. PATENT DOCUMENTS

| 3,767,379 A | 10/1973 | Marion |
| 3,844,766 A | 10/1974 | Beggs |

(Continued)

FOREIGN PATENT DOCUMENTS

| AU | 2001267125 B2 † | 1/2002 |
| AU | 2001267125 | 8/2002 |

(Continued)

OTHER PUBLICATIONS

Alvarez et al.,"Production and Utilisation of COREX ©—Hot Metal", Gorham/Intertech Consulting, Direct reduction workshop, Mar. 3, 1997, 46 pages.

(Continued)

*Primary Examiner* — George Wyszomierski
*Assistant Examiner* — Tima M McGuthry Banks
(74) *Attorney, Agent, or Firm* — Hamre, Schumann, Mueller & Larson, P.C.

(57) ABSTRACT

The present invention concerns a method and an apparatus for producing DRI (Direct Reduced Iron) utilizing a high-oxidation reducing gas containing carbon monoxide and hydrogen, derived directly or indirectly from the gasification of hydrocarbons or coal, with a high content of oxidants ($H_2O$ and $CO_2$). The invention provides a more efficient method and plant comprising a reactor in which particulate material of iron ore comes into contact with a high temperature reducing gas to produce DRI, with lower investment and operating costs, avoiding the need for a fired heater for the reducing gas fed into the reduction reactor. The reducing gas is heated to a temperature above 700° C. in two steps, a first step at a temperature below about 400° C. to prevent the phenomenon of metal dusting, by exchange of sensible heat supplied by the stream of hot spent gas removed from the reduction reactor; and a second step by means of partial or total combustion with oxygen, maintaining the temperature of the combustion gas below the limits established by the construction materials of the combustion chamber.

18 Claims, 3 Drawing Sheets

(51) Int. Cl.
*B01D 53/14* (2006.01)
*B01D 53/75* (2006.01)

(52) U.S. Cl.
CPC .............. *C21B 13/02* (2013.01); *Y02P 10/122* (2015.11); *Y02P 10/128* (2015.11); *Y02P 10/136* (2015.11); *Y02P 10/265* (2015.11); *Y02P 10/283* (2015.11)

(56) References Cited

U.S. PATENT DOCUMENTS

| | | | |
|---|---|---|---|
| 5,238,487 A | | 8/1993 | Hauk et al. |
| 5,676,732 A | | 10/1997 | Viramontes-Brown et al. |
| 5,846,268 A | † | 12/1998 | Diehl |
| 5,997,609 A | † | 12/1999 | Diehl |
| 6,033,456 A | | 3/2000 | Janke et al. |
| 6,149,859 A | | 11/2000 | Jahnke et al. |
| 6,395,056 B1 | † | 5/2002 | Villarreal-Trevino |
| 2002/0033074 A1 | † | 3/2002 | Rosenfellner |

FOREIGN PATENT DOCUMENTS

| | | | |
|---|---|---|---|
| WO | | 2007/088166 | 8/2007 |
| WO | | 2008/146112 | 12/2008 |
| WO | | 2008146112 A1 † | 12/2008 |
| WO | | 2009/037587 | 3/2009 |
| WO | WO 2012/042352 | | 4/2012 |

OTHER PUBLICATIONS

"Gorham/Intertech Consulting, Direct reduction workshop, "Production and Utilization of COREX—Hot metal"", dated Mar. 3, 1987; published in Charlotte N.C.; Authors: A. Eberle, C. Boehm, G. Schrey, presented by J. Flickenschild. 45 pages.†

† cited by third party

METHOD AND APPARATUS FOR PRODUCING DIRECT REDUCED IRON UTILIZING A SOURCE OF REDUCING GAS COMPRISING HYDROGEN AND CARBON MONOXIDE

FIELD OF THE INVENTION

The present invention is referred to a method and an apparatus for producing direct reduced iron utilizing a source of reducing gas comprising hydrogen and carbon monoxide.

BACKGROUND OF THE INVENTION

In the recent years, the necessity of increasing the steelmaking process efficiency and productivity has become more urgent, due to rising production costs and also due to the restrictions imposed upon steel plants by environmental regulations.

One of the successful routes for steelmaking, which is being increasingly promoted, is the gas based Direct Reduction of Iron Ore to produce Direct Reduced Iron (DRI), also known in the steel industry as sponge iron, by circulating a reducing gas through a moving bed of particulate iron ore at temperature of the order of 700° C. to 1100° C. Oxygen is removed from the iron ore by chemical reduction for the production of highly metallized DRI.

Some of the advantages of direct reduction plants are the wide range of production capacity, that the metallic iron is produced in solid form with low sulfur and silicon content, and that the resulting DRI may be used as raw material for the electric furnace and may constitute the whole charge thereof.

Additionally, and as a peculiar advantage of the technology proposed, given that a part of the $CO_2$ produced as by product of the reduction reactions is selectively removed from the process, total $CO_2$ emitted in the atmosphere may be considerably reduced if compared with others routes for steel production.

The reducing agents utilized in the direct reduction plants are hydrogen and carbon monoxide, obtained by reformation of natural gas in an external catalytic reformer or "in situ" within the iron reduction system. Nevertheless, a direct reduction plant can be also designed for utilizing other sources of energy available in the form of gases from coke ovens, blast furnaces, coal or oil gasification, natural gas, exhaust gases containing hydrogen and carbon monoxide arriving from other chemical/metallurgical processes, etc.

A possible source of reducing gas is the excess gas produced in the combination of a plant for the production of pig iron based on the use of coal (for example a blast furnace or a plant known in the industry with the tradename Corex) and a direct reduction reactor. Corex plants or blast furnaces produce pig iron using gasified coal by partial combustion with an oxygen-containing gas. The exhausted reducing gas withdrawn from this process, still containing $H_2$ and CO, can be utilized for reduction, after removal of at least a portion of $H_2O$ and $CO_2$.

U.S. Pat. No. 5,238,487 to Hauk et al. discloses a process comprising a melter-gasifier, a first reduction reactor and a second reduction reactor wherein DRI is produced using directly reducing gas effluent from said first reactor. As indicated in this patent, the effluent reducing gas, after being only cleaned, is mixed with dewatered spent reducing gas and treated in a $CO_2$ removal unit. The gas leaving the decarbonation station is then heated in a heat exchanger and finally subjected to a partial combustion to reach the right temperature required for the reduction reaction. Additionally, this patent teaches to use sulfur oxides and chlorine to inhibit carbon monoxide decomposition. All embodiments of this patent however utilize heat exchangers that consume a fuel for heating the reducing gas prior to the partial combustion heating stage.

U.S. Pat. No. 5,676,732 to Viramontes-Brown et al. discloses an improved method and an apparatus for utilizing in a direct reduction plant the excess exhausted gas from a first reduction reactor, which receives reducing gas from a melter-gasifier. Said method suggests to use a catalytic reactor, or shifter, for adjusting the composition of the gas stream effluent from said first reactor in order to avoid carbon deposition and corrosion in the gas heater required to heat fresh gas before feeding it into the reduction reactor. In order to get the maximum yield of $H_2$ product from the CO shift conversion, a special catalyst in a fixed bed reactor is used. For this reason, Syngas has to be further treated in order to remove substances that are poisonous for the catalyst.

Referring now to Syngas from a gasifier as alternative source of reducing gas, U.S. Pat. No. 6,149,859; and U.S. Pat. No. 6,033,456 to Jahnke et al. describe an integrated process for supplying high-pressure Syngas from a gasifier to a direct reduction plant. As in the prior art, this patent suggests to treat the Syngas in a shifter with the purpose of changing its composition in order to avoid carbon deposition when said gas is heated at a temperature higher than 400° C. (condition commonly achieved in a typical process gas heater of a Direct Reduction Plant). In this way, the conditioned gas stream, after being treated in a dedicated unit to remove $CO_2$ and being expanded to the pressure of the direct reduction circuit, is ready for being used as make up in the DRI process.

WO-A-2008/146112 discloses the additional possibility of having, in a process as described in U.S. Pat. No. 6,149,859 and U.S. Pat. No. 6,033,456, a single absorption unit wherein the acid-gas content is removed from a combined stream of both the Syngas produced in the gasifier and the recycle reducing gas from the reduction reactor.

U.S. Pat. No. 5,846,268 to Diehl et al. discloses a process for producing liquid pig iron or liquid steel pre-products and DRI from iron ore. The process shown in this patent is much similar to the process described by U.S. Pat. No. 5,238,487 to Hauk et al. where a reducing gas, derived from the gasification of coal is used for reducing iron ore in a first reduction shaft furnace and the exhausted reducing gas effluent from said first shaft furnace is utilized for producing more DRI in a second shaft furnace. This patent teaches several ways of using heat of the gas stream effluent from the second shaft furnace for preheating a portion of the same gas stream which is then utilized as fuel in a fired gas heater, but does not teach or suggests using said heat to preheat the stream of reducing gas fed to the reduction reactor.

None of the above patents teach or suggest the distinctive features of the present invention which overcome a number of disadvantages of the prior art and provide a more efficient method and apparatus for producing DRI utilizing gas derived from coal gasification in a gasifier or derived from a melter-gasifier, for example, using heat from the top gas effluent from the reduction reactor for heating the reducing gas to be fed to said reactor without consuming any additional fuel and within the practical limits of the degree of oxidation of the reducing gas for an efficient reduction of iron ore.

An additional advantage of the present invention is that the carbon dioxide emissions to the atmosphere can be decreased because there is no combustion in the heat exchanger for raising the temperature of the reducing gas prior to second heating stage of partial oxidation with oxygen.

OBJECTS OF THE INVENTION

It is therefore an object of the present invention to provide an improved process and apparatus for producing direct reduced iron (DRI) using a gas with high content of carbon monoxide possibly after being cleaned in order to remove dusts and TAR, and feeding this cleaned gas with high carbon monoxide content directly to the reduction circuit without additional treatment in a water gas shifter for changing its composition. This simplified process configuration has the further advantage that removal of compounds that are poisonous for the shifter catalyst is not required.

It is another object of the present invention to provide an improved method and apparatus for producing hot or cold DRI in which upgraded reducing gas, obtained treating a stream of Syngas previously mixed with dewatered and spent reducing gas in a $CO_2$ removal unit, is heated exclusively in a heat exchanger, without any additional fuel combustion and exploiting only sensible heat recovered from spent gas removed from the reactor; in this way the energy per ton of produced iron is decreased. Finally, said gas stream (heated $CO_2$ lean gas stream), available after heating at a temperature of less than 450° C., before being finally fed to the reactor, is subjected to a partial combustion in a combustion chamber with a stream of a molecular-oxygen-containing gas. Alternatively a portion of this gas stream is subjected to a total combustion and the combustion products are combined with the rest of said heated $CO_2$ lean gas stream. No additional gas heating means between said heat exchanger and said combustion chamber are included.

It is a further object of the invention to provide a method and apparatus for producing cold DRI utilizing a gas with a high content of carbon monoxide, and cooling said DRI by flowing through the conical discharge part of the reduction reactor a cooling gas with carburizing potential, that can be Coke Oven Gas.

SUMMARY OF THE INVENTION

The objects of the invention are generally achieved by providing a method and apparatus for producing DRI in a direct reduction system comprising a reduction reactor using a reducing gas with a high carbon monoxide content (for example a Syngas from any source which is cleaned of dust), wherein at least a part of the spent reducing gas removed from the reduction reactor is cleaned and cooled before being mixed with said cleaned Syngas to produce a combined gas stream which is subsequently fed to a $CO_2$ separation unit. Preferably, said $CO_2$ separation unit is of the adsorption type whereby a $CO_2$ laden gas stream and a $CO_2$ lean gas stream flow out of said $CO_2$ separation unit. The upgraded $CO_2$ lean reducing gas stream passes through a heat exchanger where only exchanging sensible heat recovered from said spent reducing gas removed from the reduction reactor and without any combustion, is heated at a temperature lower than 450° C. This heated $CO_2$ lean reducing gas stream is then partially combusted with a molecular-oxygen-containing gas in order to raise its temperature above 700° C. measured at the reactor inlet, thus dispensing the need of an additional heating in a conventional fired gas heater.

Another object of the invention is achieved by providing a method and apparatus for producing DRI as described above and having a desired amount of carbon, by cooling said DRI with a carburizing gas that is circulated in the lower part of said reduction reactor as for example Coke Oven Gas.

BRIEF DESCRIPTION OF THE DRAWINGS

The detailed description of some preferred embodiments of the invention will be better understood with reference to the accompanying drawings wherein like numerals designate like elements for convenience of the reader.

The Figures disclose.

DETAILED DESCRIPTION OF THE INVENTION

Figure 1:
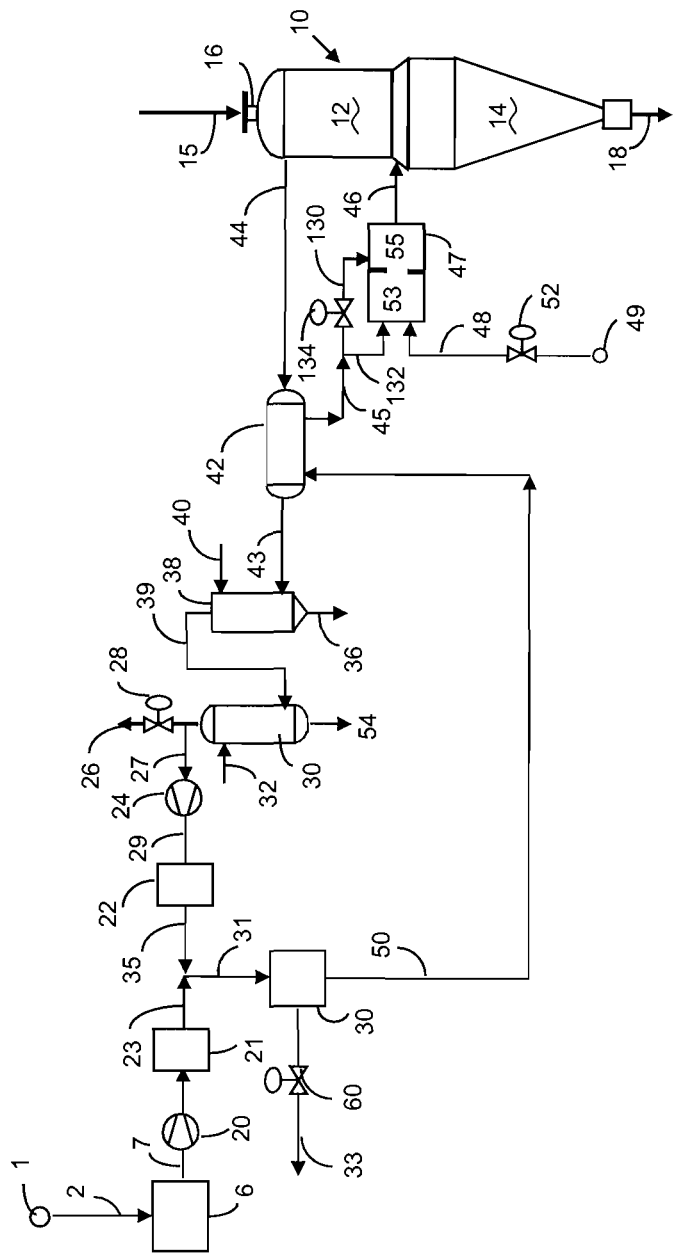
FIG. 1 shows a schematic process diagram of a direct reduction process incorporating one embodiment of the invention.

FIG. 1 shows a Direct Reduction System where numeral 10 generally designates a vertical shaft, moving bed, iron ore gaseous reduction reactor, having a reduction zone 12, to which iron ore 15 is fed through at least one inlet 16 in the form of lumps, pellets, or any blend thereof. This iron ore 15 descends by gravity through the reactor 10 in counter-current contact with a reducing gas at high temperature.

This reducing gas is introduced to the reactor through pipe 46 located in the lower part of the reduction zone 12, and is mainly comprised of hydrogen and carbon monoxide which react with the iron ores to produce direct reduction iron (DRI) 18, which is discharged from reactor 10 through its conical lower part 14.

Spent reducing gas 44, removed from the top of the reactor at a temperature ranging from 300° C. to 600° C., is treated to be upgraded in a recycle circuit and finally returned back to the reduction zone 12 through pipe 46. In detail, this spent reducing gas stream 44, with a partially depleted reducing capacity, passes through a heat exchanger 42, where sensible heat removed from said gas stream 44 is recovered to preheat the upgraded portion of reducing gas 50 prior to being recycled back to the reactor 10.

After passing through heat exchanger 42, the partially-cooled spent gas is conducted through conduit 43 to a cleaning station 38, where dust is removed by contact with a water stream 40 withdrawn as stream 36, and the effluent clean gas 39 is then passed to a cooling station 30, usually of the direct contact type, where the water by-product of the reduction reaction is condensed by contact with water 32 and then removed from the reducing gas as water stream 54.

For maintaining a low $N_2$ concentration in the recycle circuit, a minor portion of the cleaned and dewatered spent gas is purged from the system through pipe 26 having a pressure control valve 28 (for pressure control). The purged gas stream 26 contains carbon monoxide, carbon dioxide, hydrogen and methane in quantities such that the gas can be used as fuel in standard combustion systems. The remaining main portion of this cleaned and dewatered reducing effluent gas is subsequently transferred, flowing through conduit 27, to a compressor 24 wherein its pressure is raised to a level suitable for further treatment and use.

The compressed reducing gas stream 29 undergoes an additional cooling step in a heat exchanger or a quench tower packed vessel 22, required to lower the gas temperature after compression; the stream of gas obtained 35 is mixed with make-up gas stream 23 containing carbon monoxide and hydrogen, for example Syngas derived from the gasification of coal or other hydrocarbon feedstock or export gas from a melter-gasifier system effluent from its associated reduction furnace.

This Syngas 23, supplied from a suitable source 1, is fed through pipe 2 to a gas cleaning system 6 where dust, tar and water are removed. The obtained stream 7 of clean Syngas, mainly composed of $H_2$, CO, $CO_2$ and $CH_4$, is first compressed in a Syngas compressor 20 and cooled in a dedicated equipment 21, that can be a heat exchanger or a quench tower, before being added as make-up to the reduction circuit of reactor 10 as stream 23.

After mixing the dewatered reducing gas stream 35 with the clean Syngas (make-up gas stream 23), the $CO_2$ contained in this resulting gas stream 31 is at least partially removed in the $CO_2$ removal unit 70. Said unit is preferably of the type of PSA (Pressure Swing Adsorption) units or VPSA (Vacuum Pressure Swing Adsorption) whereby $CO_2$ is concentrated in a gas stream 33, which is subsequently removed from the system as purge and eventually used as fuel; the gas stream 33 is adjusted by a pressure control valve 60. The PSA unit, that utilizes adsorbent surfaces to block polar and less volatile molecules, removes from said stream 31 water and $H_2S$ molecules too.

According to a principle of the invention, the upgraded portion of the reduction gas 50, with a low $CO_2$ concentration and an improved high reducing potential, leaves the $CO_2$ removal unit and is fed to the previously described heat exchanger 42 where it is heated at a temperature lower than 450° C. in order to prevent the onset of chemical corrosion reactions of the metal materials of the exchanger 42 (for example using the mechanism known as "metal dusting"). Since there is no combustion in exchanger 42 there is no additional emissions of carbon dioxide to the atmosphere.

The temperature of the resultant gas stream 45, at a value below 450° C., is then increased up to the desired final value in a second stage by means of combustion of a portion of the preheated $CO_2$ lean gas stream. To this end, the preheated $CO_2$ lean gas stream 45 is divided in a first portion 132 which is directly sent to a combustion chamber 47, where it is combusted with a stream of a molecular-oxygen-containing gas stream 48, preferably oxygen of industrial purity, supplied from a suitable source 49. The amount of oxygen is regulated by valve 52 in response to the level of temperature desired for the reducing gas flowing through pipe 46. The amount of oxygen is also regulated so that the value of the ratio of reducing agents to oxidant agents $(H_2+CO)/(H_2O+CO_2)$ in the heated gas stream 46 is at least 7; or that the reducing index calculated as: $(H_2+CO)/(H_2+CO+H_2O+CO_2)$ of gas stream 46 fed to the reduction reactor is at least 0.87.

The combustion may be carried out by means of a dedicated burner or by injection of oxygen through injection lances in a combustion zone 53 located inside the combustion chamber 47. The remaining portion of reducing gas 45, or gas stream 130, is then fed to the mixing zone 55 of combustion chamber 47 so that the partially or totally combusted gas, mixed with the remaining reducing gas 130, reaches a temperature higher than 700° C. at the reactor inlet. The gas stream 130 may also be fed to the combustion zone 53 of combustion chamber 47 in order to protect the materials of the combustion chamber from the high temperatures that may be reached due to the stream. Regulation of the amount of gas stream 132 is controlled by control valve 134 in response to the desired temperature for the reducing gas 46 to be introduced into the reduction zone 12 of the reactor 10 and in accordance with the maximum temperature allowed by the design and materials of the combustion chamber. In one example, the flow rate of gas stream 132, which is partially or totally combusted in combustion chamber 47, is in the range of 50% to 70% of the flow rate of gas stream 45. The flow rate of reducing gas 132 and the quantity of oxygen 48 are controlled in accordance with the temperature desired for the reducing gas stream flowing through the pipe 46 by means of the valves, respectively 134 and 52.

The gas stream 130 may also be combined with the partially or totally combusted gas stream outside of the combustion chamber 47 to adjust the temperature of the combined reducing gas stream until it reaches the suitable value for being introduced into the reduction zone of the reactor 10 through conduit 46 for reducing the iron ore contained therein.

The combustion chamber 47 is preferably preheated to temperatures above 600° C. for assuring that the mixture of reducing gas and oxygen is maintained under ignition in order to prevent the formation of any potential explosive mixtures.

Particulate solid iron ores 15 are contacted within the reduction zone 12 with said high-temperature upgraded reducing gas fed through pipe 46 into the reactor 10. In this way the solid material, flowing counter-currently with this gas, reacts with hydrogen and carbon monoxide producing direct reduced iron (DRI). The DRI, flowing through the lower discharge zone 14, is then discharged from said reactor 10 through the lower discharge zone 14, hot or cold, depending on the type of subsequent utilization of the DRI.

When DRI is discharged at high temperature (as shown in FIG. 1), on the order of 400° C. to 750° C., it can be subsequently briquetted for further storage and handling or pneumatically transported, or alternatively by means of tanks or inertized belts, directly to a steelmaking furnace in a manner known in the art.

Figure 2:
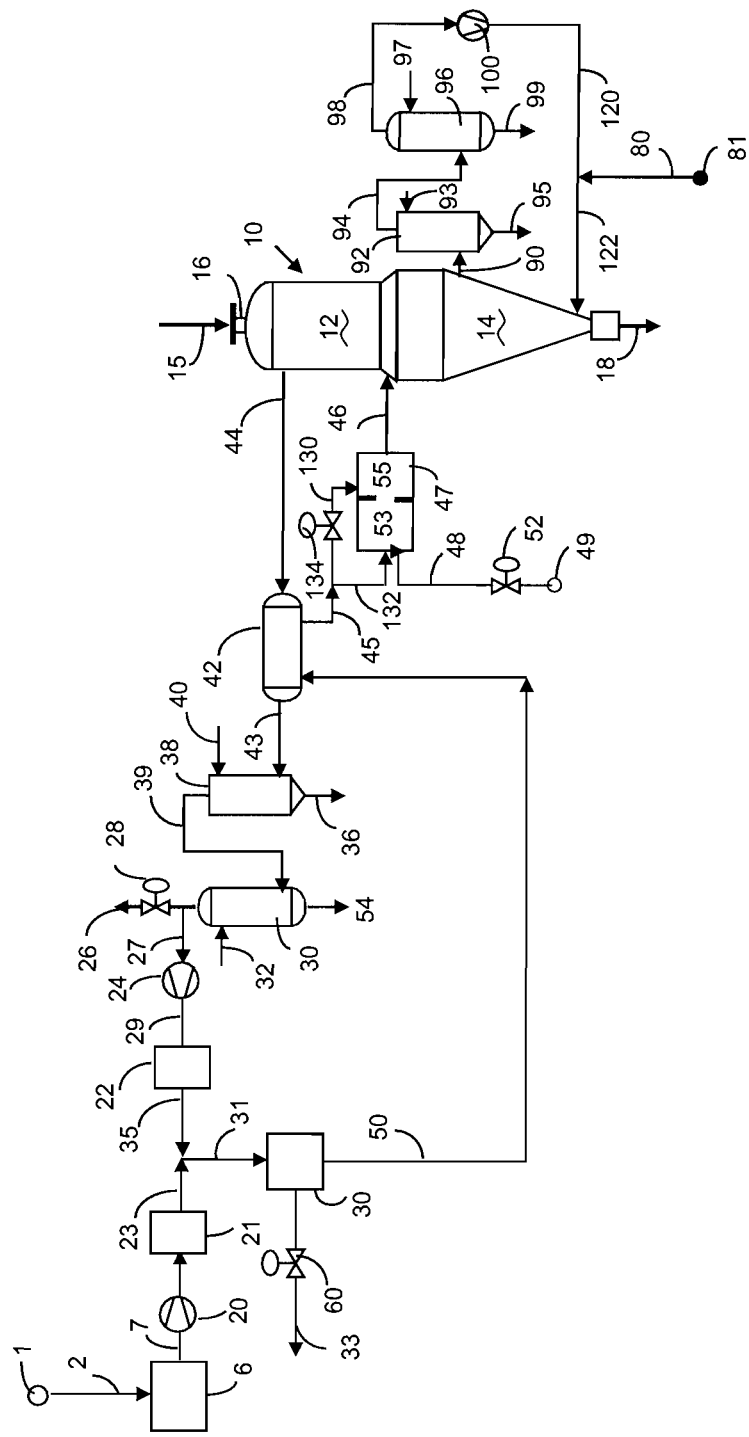
FIG. 2 shows a schematic process diagram of a direct reduction process incorporating a second embodiment of the invention.

If DRI has to be cold produced (as shown in FIG. 2, where identical components to those in FIG. 1 have the same reference numbers and are therefore not described again here), the DRI is cooled down by passing counter-currently a cooling gas stream 122 at a relatively low temperature through the conical part 14 of the reactor 10, whereby the cooling gas temperature is increased and the temperature of the DRI is lowered to a temperature usually below 100° C. Cooling gas make-up 80 is fed to the cooling gas circuit from a suitable source 81 that can be for example Coke Oven Gas if available, natural gas or other hydrocarbon-containing gas so that said hydrocarbons are cracked in contact with the hot DRI and in this way DRI with the desired amount of combined carbon or graphite is produced.

Figure 3:
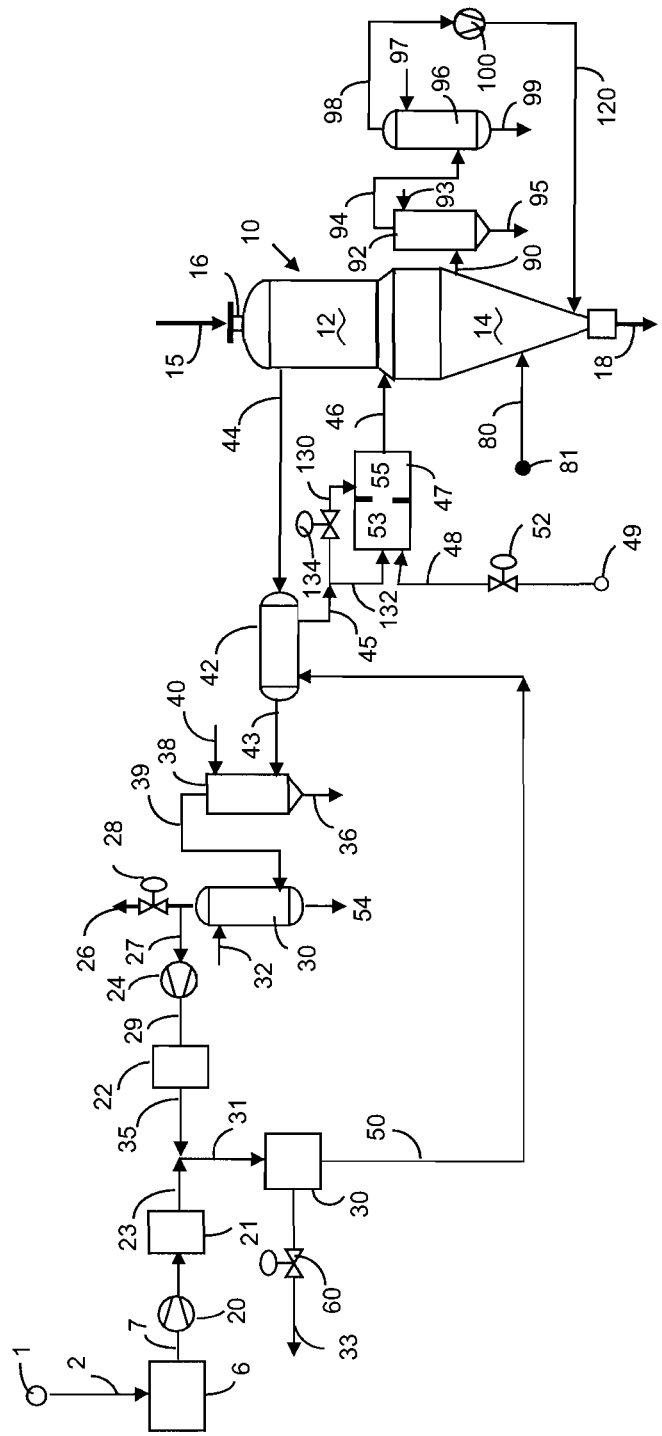
FIG. 3 shows a schematic process diagram of a direct reduction process incorporating a third embodiment of the invention.

In another embodiment of the invention shown in FIG. 3 (where identical components to those in FIG. 1 have the same reference numbers and are therefore not described again here), Coke Oven Gas from a source 81 is used as carburizing and cooling gas stream 80 and fed directly to the reactor cone at a desired location where the temperature of DRI is high. In this way, a further advantage is obtained because the hydrocarbons typically contained in Coke Oven Gas are destroyed by cracking.

The hot and spent cooling gas stream 90 may be cooled down and recycled in a manner well known in the art. Briefly, the warmed up gas withdrawn from the top of the cooling zone, is further treated in a cleaning station 92 to remove dust by washing with water 93 which is withdrawn through pipe 95; the clean gas 94 is treated in a cooling station 96, where it is completely de-watered and cooled by contact with water 97 which is withdrawn through pipe 99. The gas obtained 98 is compressed by means of compressor 100 before being fed to the reactor through pipe 120.

In a further embodiment of the invention, the DRI may be hot discharged from the reduction reactor at a temperature in the order of 400° C. to 750° C., and it may be cooled down to a temperature lower than 100° C., to avoid its re-oxidation by atmospheric oxygen and water, in a separate DRI cooling vessel (not shown) external to the reduction reactor 10, with a cooling gas system similar to the cooling gas system previously described. With this configuration, the iron reduction plant, designed to produce hot DRI for its immediate melting, can provide also for an emergency discharge of DRI in safe conditions, with the material available at an adequate temperature for storage and later utilization.

An alternative design for a direct reduction plant with the capacity of producing both hot or cold DRI provides the reduction reactor with a cooling gas system designed to optionally enable or not the operation of the cooling system, whereby the same reactor may cool the DRI inside the discharge cone or discharge it at high temperature.

According to an exemplary embodiment of the invention, in which the second heating stage of the $CO_2$ lean gas stream is combusted with 76 Nm3/t of DRI with 95% pure oxygen, the relative amounts of some of the components of the reducing gas which is heated to 838° C. suitable for reduction of iron ores, are presented in Table 1 below:

TABLE 1

| | | HYDROGEN AND CO CONTAINING GAS | GAS EFFLUENT FROM PSA UNIT | REDUCING GAS FED TO REACTOR | EFFLUENT GAS FROM REDUCTION ZONE |
|---|---|---|---|---|---|
| GAS STREAM NO. | | 23 | 50 | 46 | 44 |
| TEMPERATURE | ° C. | 45 | 48 | 838 | 519 |
| FLOW | NCM/TON DRI | 1622 | 1997 | 1998 | 2060 |
| Composition | | | | | |
| H2 | VOL % | 18.070 | 33.926 | 26.354 | 23.196 |
| CO | VOL % | 43.168 | 48.418 | 48.408 | 29.503 |
| CO2 | VOL % | 32.125 | 2.000 | 2.000 | 19.669 |
| H2O | VOL % | 1.116 | 0.001 | 7.566 | 12.627 |
| CH4 | VOL % | 2.309 | 3.326 | 3.325 | 2.930 |
| N2 and other gases | VOL % | 3.212 | 12.333 | 12.347 | 11.975 |
| REDUCING INDEX | | 0.65 | 0.98 | 0.89 | 0.62 |

The reducing index is calculated as: $(H_2+CO)/(H_2+CO+H_2O+CO_2)$ and indicates the reducing power of each gas stream.

From table 1, it can be seen that the present invention provides an effective method and apparatus for producing DRI utilizing a gas containing H2 and CO with a low Reducing Index and an effective two-stages gas heating to the desired reduction temperature.

The present invention brings a number of advantages over the prior art, namely, a simpler iron ore reduction plant and process are possible because the fired heater, for preheating the reducing gas before raising its temperature to the reduction levels, is not needed. Therefore a direct reduction plant incorporating the invention has lower capital and operation costs because an important piece of equipment (the heater) requiring operation and maintenance materials and manpower is avoided.

It is of course to be understood that the above description of some embodiments of the invention has been made for purposes of illustration and not of limitation of the scope of the invention and that a number of changes may be made to the embodiments herein described as the application of the invention best fits a particular practical case without departing from the spirit and scope of the invention which is determined by the appended claims.

The invention claimed is:

1. A method for producing DRI (Direct Reduced Iron) utilizing a source of make-up reducing gas containing carbon monoxide and hydrogen in a reduction plant comprising a reduction reactor having an upper reduction zone where iron-oxides are reduced and transformed to DRI containing metallic iron by a high-temperature reducing gas, mainly composed of hydrogen and carbon monoxide, and a lower discharge zone, said method comprising:

withdrawing a stream of hot spent reducing gas from said reduction zone of the reduction reactor, at a temperature between 300° C. and 600° C.;

passing said stream of hot spent reducing gas through a heat exchanger where its temperature is reduced to a level from 200° C. to 400° C. and then through a cooling station where its temperature is lowered to a level below 100° C. resulting in a cold spent recycle gas stream;

mixing said make-up reducing gas stream with at least a portion of said cold spent reducing gas stream, to produce a mixed gas stream;

passing said mixed gas stream through a $CO_2$ separation unit whereby a $CO_2$ lean gas stream and a $CO_2$ laden gas stream are formed;

passing said $CO_2$ lean gas stream through said heat exchanger wherein heat is recovered from said hot spent reducing gas withdrawn from the reduction reactor and is used to raise the temperature of said $CO_2$ lean gas stream to a level lower than 450° C. in a first heating stage without any fuel combustion, to form a heated $CO_2$ lean gas stream;

splitting the heated $CO_2$ lean gas stream in at least two portions; raising the temperature of a first portion of said heated $CO_2$ lean gas stream to above 700° C. by partial combustion in a combustion chamber with a stream of a molecular-oxygen-containing gas, or by total combustion of the first portion of said heated $CO_2$ lean gas stream, wherein the combustion produces combustion products, and combining the combustion products with a second portion of said heated $CO_2$ lean gas stream to form a hot reducing gas stream;

feeding said hot reducing gas stream after said combustion to the reduction zone of said reactor; and discharging DRI from a lower part of the reduction reactor.

2. The method for producing DRI according to claim 1, in which the ratio of reducing agents to oxidant agents in the reducing gas stream fed to said reduction reactor, defined as $(H2+CO)/(H^2+CO_2)$ in percent volume is at least 7.

3. The method for producing DRI according to claim 1, in which the reducing index in the reducing gas stream fed to said reduction reactor, defined as $(H2+CO)/(H2+CO+H_2+CO_2)$ in percent volume is at least 0.87.

4. The method for producing DRI according to claim 1, in which said reduction reactor is a moving bed reactor.

5. The method for producing DRI according to claim 1, in which said $CO_2$ separation unit is a pressure swing adsorption (PSA) or a vacuum pressure swing adsorption (VPSA) unit.

6. The method for producing DRI according to claim 5, wherein said molecular-oxygen-containing gas is oxygen of industrial purity.

7. The method for producing DRI according to claim 5, wherein said molecular-oxygen-containing gas is oxygen-enriched air.

8. The method for producing DRI according to claim 5, wherein the portion of the $CO_2$ lean gas fed to the combustion chamber is between 50% and 70% by volume of the total $CO_2$ lean gas stream.

9. The method for producing DRI according to claim 1, in which said $CO_2$ separation unit is a chemical absorption unit.

10. The method for producing DRI according to claim 1, wherein the flow rates of the $CO_2$ lean gas and of the molecular-oxygen-containing gas are controlled in such a manner that the partial or total combustion in said combustion chamber is carried out without any significant formation of soot.

11. The method for producing DRI according to claim 1, where said DRI is cooled inside the lower discharge zone of the reactor by circulating a cooling gas that is recycled in a closed cooling circuit.

12. The method for producing DRI according to claim 11, further comprising feeding, to said closed cooling circuit, a non-oxidant cooling gas containing hydrocarbons for increasing the carbon content of said DRI.

13. The method for producing DRI according to claim 12, wherein said non-oxidant cooling gas containing hydrocarbons is fed directly to the lower discharge zone of said reduction reactor.

14. The method for producing DRI according to claim 11, wherein said cooling gas is Coke Oven Gas.

15. An apparatus for producing DRI (Direct Reduced Iron) utilizing as a reducing gas sourc; a gas stream containing carbon monoxide and hydrogen in a reduction plant comprising:

a reduction reactor having a reduction zone, where iron-oxides are reduced and transformed to DRI containing metallic iron by a high-temperature reducing gas mainly composed of hydrogen and carbon monoxide, and a discharge zone, said reduction zone having a gas inlet and a gas outlet, the apparatus further including a gas-gas heat exchanger for preheating reducing gas without any combustion by exploiting heat provided from hot spent gas effluent from said reduction reactor and for cooling said hot spent gas effluent from said reduction reactor;

a gas compressor;

a $CO_2$ separation unit; and a combustion chamber having a combustion zone and a mixing zone;

a first conduit connecting the gas outlet of said reduction zone of the reduction reactor with the heat exchanger; a second conduit connecting the outlet of said heat exchanger for cooling said hot spent gas effluent from said reduction reactor;

a third conduit connecting the heat exchanger for cooling said hot spent gas effluent from said reduction reactor with the compressor;

a fourth conduit connecting the compressor with said $CO_2$ separation unit;

a fifth conduit connecting the $CO_2$ separation unit with said heat exchanger;

a sixth conduit directly connecting said heat exchanger with the combustion chamber without any gas heating between said heat exchanger and said combustion chamber;

a seventh conduit connecting the combustion chamber with said gas inlet of the reduction zone;

a tenth conduit for introducing oxygen or a molecular-oxygen-containing gas into said combustion chamber and control for controlling the amount of molecular-oxygen-containing gas in response to the desired temperature of the gas stream at the gas inlet of said reduction zone, the apparatus further comprising control for controlling an amount of reducing gas by-passing said combustion chamber, wherein said gas is combined with a hot gas that flows from said combustion chamber.

16. The apparatus for producing DRI according to claim 15, further comprising an eighth conduit for introducing and directing a hydrocarbon-containing cooling gas to a lower discharge zone of the reduction reactor.

17. The apparatus for producing DRI according to claim 15, further comprising a ninth conduit for introducing and directing coke oven gas to a lower discharge zone of the reduction reactor.

18. The apparatus for producing DRI according to claim 15, wherein said reduction reactor is adapted for selectively operating a cooling gas circulation system for cooling said DRI allowing for optionally discharging hot or cold DRI.

* * * * *